(12) United States Patent
Kobayashi

(10) Patent No.: US 8,817,864 B2
(45) Date of Patent: Aug. 26, 2014

(54) COMMUNICATION DEVICE AND METHOD OF SETTING COMMUNICATION DEVICE

(75) Inventor: Masato Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/301,656

(22) Filed: Nov. 21, 2011

(65) Prior Publication Data

US 2012/0201287 A1 Aug. 9, 2012

(30) Foreign Application Priority Data

Feb. 3, 2011 (JP) .................................. 2011-022150

(51) Int. Cl.
*H04B 3/04* (2006.01)
*H04B 3/46* (2006.01)
*H04L 25/03* (2006.01)
*H04L 25/02* (2006.01)

(52) U.S. Cl.
CPC ............ *H04L 25/03885* (2013.01); *H04B 3/04* (2013.01); *H04B 3/464* (2013.01); *H04L 25/0288* (2013.01); *H04L 25/0272* (2013.01)
USPC ........... 375/232; 375/296; 375/346; 375/347; 375/349; 370/208; 370/286; 370/462; 370/463

(58) Field of Classification Search
USPC ........................................................ 370/201
See application file for complete search history.

(56) References Cited

U.S. PATENT DOCUMENTS

| | | | | |
|---|---|---|---|---|
| 4,583,235 A | * | 4/1986 | Domer et al. ................. | 375/229 |
| 5,483,551 A | * | 1/1996 | Huang et al. ................. | 375/219 |
| 5,991,337 A | * | 11/1999 | Giles ............................. | 375/222 |
| 6,084,704 A | * | 7/2000 | Button et al. ................. | 359/337 |
| 6,339,613 B2 | * | 1/2002 | Terry ............................. | 375/227 |
| 6,342,966 B1 | * | 1/2002 | Button et al. ............... | 359/341.2 |
| 6,583,649 B2 | * | 6/2003 | Nakamura .................... | 326/101 |
| 7,069,528 B2 | * | 6/2006 | Kovacs et al. ................ | 716/113 |
| 7,383,522 B2 | * | 6/2008 | Murgai et al. ................ | 716/113 |
| 7,408,426 B2 | * | 8/2008 | Broyde et al. ............... | 333/100 |
| 7,656,955 B2 | * | 2/2010 | Manstorfer et al. ......... | 375/257 |
| 7,697,600 B2 | * | 4/2010 | Maangat et al. ............. | 375/229 |
| 8,314,645 B2 | * | 11/2012 | Kobayashi .................... | 327/291 |
| 2003/0121012 A1 | * | 6/2003 | Mishima et al. ................. | 716/5 |
| 2005/0152460 A1 | * | 7/2005 | Yoshimi et al. .............. | 375/257 |
| 2006/0188043 A1 | * | 8/2006 | Zerbe et al. .................... | 375/346 |

(Continued)

FOREIGN PATENT DOCUMENTS

| | | |
|---|---|---|
| JP | 2000-067104 A | 3/2000 |
| JP | 2003-078511 | 3/2003 |

OTHER PUBLICATIONS

JPOA—Office Action of Japanese Patent Application 2011-022150 mailed on May 13, 2014 with translation of the relevant part, p. 1, line 1 to line 6 & p. 1, line 10 to p. 2, line 7 of the Office Action.

*Primary Examiner* — Ian N Moore
*Assistant Examiner* — Lakeram Jangbahadur
(74) *Attorney, Agent, or Firm* — Fujitsu Patent Center

(57) ABSTRACT

A communication device includes multiple paths that are provided in the device and transmit signals; an adjuster that adjusts transmission characteristics to be a favorable state by adjustment of the waveform of the signals on the paths; and a controller that controls the adjustment of the transmission characteristics of the paths by the adjuster, identifies other path(s) that affects a path to be adjusted, and controls suppression of crosstalk due to the other path(s).

7 Claims, 10 Drawing Sheets

(56) References Cited

U.S. PATENT DOCUMENTS

| | | | |
|---|---|---|---|
| 2008/0238519 A1* | 10/2008 | Kapoor | 327/297 |
| 2011/0267073 A1* | 11/2011 | Chengson et al. | 324/628 |
| 2011/0305271 A1* | 12/2011 | Zerbe et al. | 375/232 |
| 2011/0310378 A1* | 12/2011 | Froggatt et al. | 356/35.5 |
| 2012/0019578 A1* | 1/2012 | Van Brocklin et al. | 347/10 |
| 2012/0114032 A1* | 5/2012 | Ho et al. | 375/229 |
| 2012/0201287 A1* | 8/2012 | Kobayashi | 375/232 |
| 2012/0273267 A1* | 11/2012 | Nordin et al. | 174/70 R |

* cited by examiner

| | PATH A | PATH B | PATH C | PATH D | PATH E | PATH F | PATH G | PATH H |
|---|---|---|---|---|---|---|---|---|
| PATH A | - | ○ | | | | | | |
| PATH B | ○ | - | ○ | | | | | |
| PATH C | | ○ | - | ○ | | | | |
| PATH D | | | ○ | - | ○ | | | |
| PATH E | | | | ○ | - | ○ | | |
| PATH F | | | | | ○ | - | ○ | |
| PATH G | | | | | | ○ | - | ○ |
| PATH H | | | | | | | ○ | - |

PATH TO BE IMPROVED / PATH CAUSING CROSSTALK

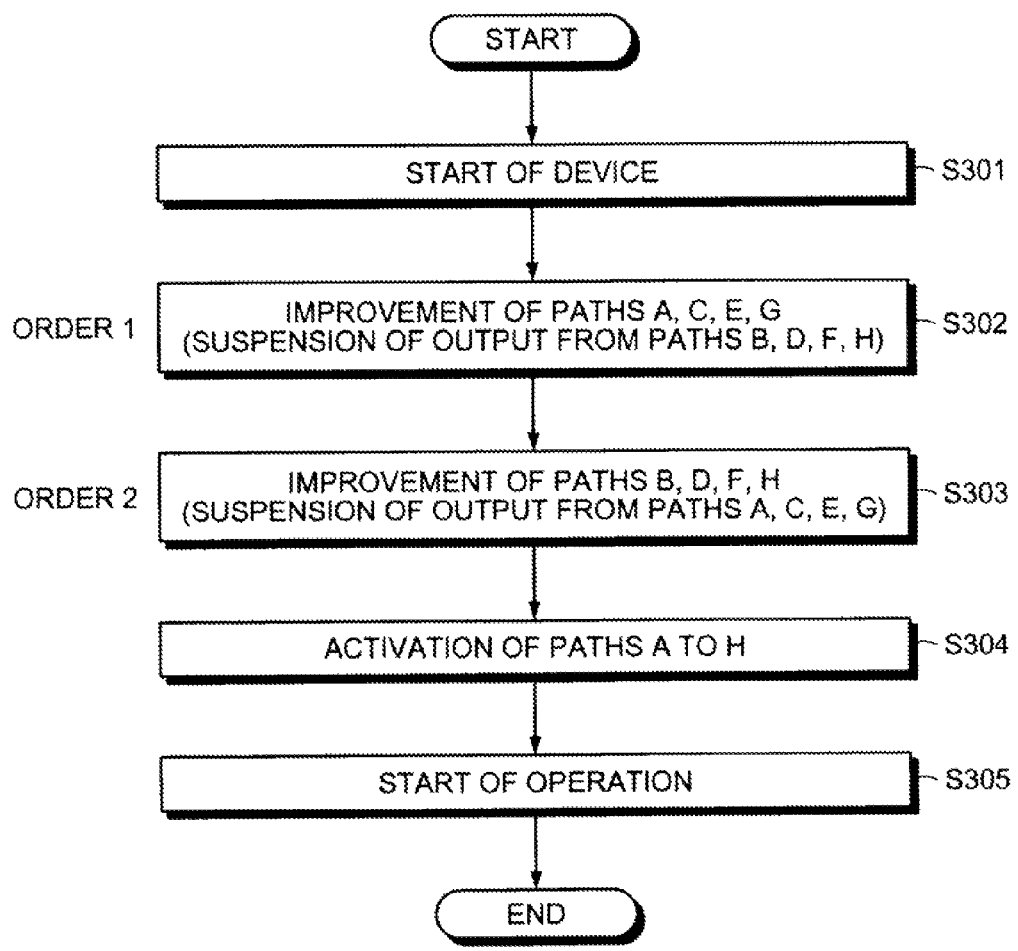

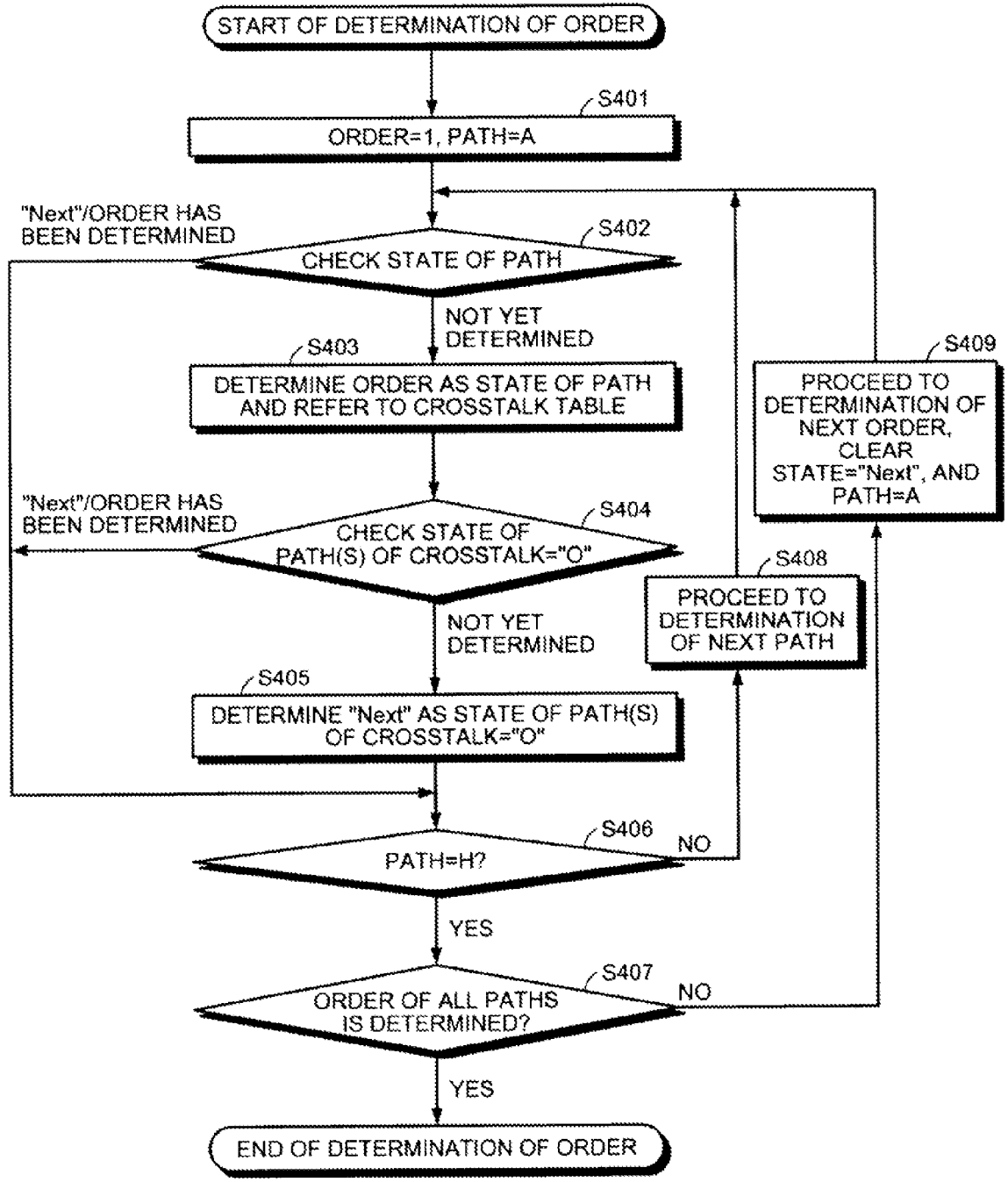

FIG.5

| ORDER | PATH | DETERMINATION OF EXECUTION SEQUENCE | | PATH A | PATH B | PATH C | PATH D | PATH E | PATH F | PATH G | PATH H |
|---|---|---|---|---|---|---|---|---|---|---|---|
| | | | ACTION | | | | STATE | | | | |
| 1 | A | CHECK STATE REFER TO TABLE | SET STATE=1 SET PATH B="Next" | 1 1 | Next | | | | | | |
| | B | CHECK STATE | PROCEED TO NEXT PATH | 1 | Next | | | | | | |
| | C | CHECK STATE REFER TO TABLE | SET STATE=1 SET PATH D="Next" | 1 1 | Next Next | 1 1 | Next | | | | |
| | D | CHECK STATE | PROCEED TO NEXT PATH | 1 | Next | 1 | Next | | | | |
| | E | CHECK STATE REFER TO TABLE | SET STATE=1 SET PATH F="Next" | 1 1 | Next Next | 1 1 | Next Next | 1 1 | Next | | |
| | F | CHECK STATE | PROCEED TO NEXT PATH | 1 | Next | 1 | Next | 1 | Next | | |
| | G | CHECK STATE REFER TO TABLE | SET STATE=1 SET PATH H="Next" | 1 1 | Next Next | 1 1 | Next Next | 1 1 | Next Next | 1 1 | Next |
| | H | CHECK STATE | PROCEED TO NEXT PATH | 1 | Next | 1 | Next | 1 | Next | 1 | Next |
| | | FIX ORDER | PATH NOT YET DETERMINED REMAINS CLEAR "Next" AND PROCEED TO NEXT ORDER | 1 | | 1 | | 1 | | 1 | |
| 2 | A | CHECK STATE REFER TO TABLE | SET STATE=2 DETERMINED: PROCEED TO NEXT PATH | 1 1 | | 1 1 | | 1 1 | | 1 1 | |
| | B | CHECK STATE REFER TO TABLE | SET STATE=2 STATE OF PATHS A AND C IS DETERMINED | 1 1 | 2 2 | 1 1 | | 1 1 | | 1 1 | |
| | C | CHECK STATE | DETERMINED: PROCEED TO NEXT PATH | 1 | 2 | 1 | | 1 | | 1 | |
| | D | CHECK STATE REFER TO TABLE | SET STATE=2 STATE OF PATHS C AND E IS DETERMINED | 1 1 | 2 2 | 1 1 | 2 2 | 1 1 | | 1 1 | |
| | E | CHECK STATE | DETERMINED: PROCEED TO NEXT PATH | 1 | 2 | 1 | 2 | 1 | | 1 | |
| | F | CHECK STATE REFER TO TABLE | SET STATE=2 STATE OF PATHS E AND G IS DETERMINED | 1 1 | 2 2 | 1 1 | 2 2 | 1 1 | 2 2 | 1 1 | |
| | G | CHECK STATE | DETERMINED: PROCEED TO NEXT PATH | 1 | 2 | 1 | 2 | 1 | 2 | 1 | |
| | H | CHECK STATE REFER TO TABLE | SET STATE=2 STATE OF PATHS G IS DETERMINED | 1 1 | 2 2 | 1 1 | 2 2 | 1 1 | 2 2 | 1 1 | 2 2 |
| | | FIX ORDER | FIX STATE OF ALL PATHS | 1 | 2 | 1 | 2 | 1 | 2 | 1 | 2 |

FIG.7

COMMON CROSSTALK TABLE 601

| | | PATH CAUSING CROSSTALK | | | | | | | |
|---|---|---|---|---|---|---|---|---|---|
| | | PATH A | PATH B | PATH C | PATH D | PATH E | PATH F | PATH G | PATH H |
| PATH TO BE IMPROVED PATH | PATH A | – | ○ | | | | | | |
| | PATH B | ○ | – | ○ | | | | | |
| | PATH C | | ○ | – | ○ | | | | |
| | PATH D | | | ○ | – | ○ | | | |
| | PATH E | | | | ○ | – | ○ | | |
| | PATH F | | | | | ○ | – | ○ | |
| | PATH G | | | | | | ○ | – | ○ |
| | PATH H | | | | | | | ○ | – |

OR

TRANSMISSION-UNIT CROSSTALK TABLE 602

| | | PATH CAUSING CROSSTALK | | | | | | | |
|---|---|---|---|---|---|---|---|---|---|
| | | PATH A | PATH B | PATH C | PATH D | PATH E | PATH F | PATH G | PATH H |
| PATH TO BE IMPROVED PATH | PATH A | – | | | | | ○ | | |
| | PATH B | | – | | | | | | |
| | PATH C | | | – | | | | | |
| | PATH D | | | | – | | | | |
| | PATH E | | | | | – | | | |
| | PATH F | ○ | | | | | – | | |
| | PATH G | | | | | | | – | |
| | PATH H | | | | | | | | – |

602a ... 602a

OR

RECEPTION-UNIT CROSSTALK TABLE 603

| | | PATH CAUSING CROSSTALK | | | | | | | |
|---|---|---|---|---|---|---|---|---|---|
| | | PATH A | PATH B | PATH C | PATH D | PATH E | PATH F | PATH G | PATH H |
| PATH TO BE IMPROVED PATH | PATH A | – | | | | | | | |
| | PATH B | | – | | | | | | ○ |
| | PATH C | | | – | | | | | |
| | PATH D | | | | – | | | | |
| | PATH E | | | | | – | | | |
| | PATH F | | | | | | – | | |
| | PATH G | | | | | | | – | |
| | PATH H | | ○ | | | | | | – |

603a ... 603a

⬇

MERGED CROSSTALK TABLE 701

| | | PATH CAUSING CROSSTALK | | | | | | | |
|---|---|---|---|---|---|---|---|---|---|
| | | PATH A | PATH B | PATH C | PATH D | PATH E | PATH F | PATH G | PATH H |
| PATH TO BE IMPROVED PATH | PATH A | – | ○ | | | | ○ | | |
| | PATH B | ○ | – | ○ | | | | | ○ |
| | PATH C | | ○ | – | ○ | | | | |
| | PATH D | | | ○ | – | ○ | | | |
| | PATH E | | | | ○ | – | ○ | | |
| | PATH F | ○ | | | | ○ | – | ○ | |
| | PATH G | | | | | | ○ | – | ○ |
| | PATH H | | ○ | | | | | ○ | – |

| ORDER | PATH | DETERMINATION OF EXECUTION SEQUENCE | | STATE | | | | | | | | |
|---|---|---|---|---|---|---|---|---|---|---|---|---|
| | | | ACTION | PATH A | PATH B | PATH C | PATH D | PATH E | PATH F | PATH G | PATH H |
| 1 | A | CHECK STATE | SET STATE=1 | 1 | | | | | | | |
| | B | REFER TO TABLE | SET PATH B, F="Next" | 1 | Next | | | | Next | | |
| | B | CHECK STATE | PROCEED TO NEXT PATH | 1 | Next | | | | Next | | |
| | C | CHECK STATE | SET STATE=1 | 1 | Next | 1 | | | Next | | |
| | | REFER TO TABLE | SET PATH D="Next" | 1 | Next | 1 | Next | | Next | | |
| | D | CHECK STATE | PROCEED TO NEXT PATH | 1 | Next | 1 | Next | | Next | | |
| | E | CHECK STATE | SET STATE=1 | 1 | Next | 1 | Next | 1 | Next | | |
| | | REFER TO TABLE | SET PATH F="Next" | 1 | Next | 1 | Next | 1 | Next | | |
| | F | CHECK STATE | PROCEED TO NEXT PATH | 1 | Next | 1 | Next | 1 | Next | | |
| | G | CHECK STATE | SET STATE=1 | 1 | Next | 1 | Next | 1 | Next | 1 | |
| | | REFER TO TABLE | SET PATH H="Next" | 1 | Next | 1 | Next | 1 | Next | 1 | Next |
| | H | CHECK STATE | PROCEED TO NEXT PATH | 1 | Next | 1 | Next | 1 | Next | 1 | Next |
| | | | PATH NOT YET DETERMINED REMAINS | 1 | Next | 1 | Next | 1 | Next | 1 | Next |
| | | FIX ORDER | CLEAR "Next" AND PROCEED TO NEXT ORDER | 1 | | 1 | | 1 | | 1 | |
| 2 | A | CHECK STATE | DETERMINED: PROCEED TO NEXT PATH | 1 | | 1 | | 1 | | 1 | |
| | B | CHECK STATE | SET STATE=2 | 1 | 2 | 1 | | 1 | | 1 | |
| | | REFER TO TABLE | STATE OF PATHS A AND C IS DETERMINED SET PATH H="Next" | 1 | 2 | 1 | | 1 | | 1 | Next |
| | C | CHECK STATE | DETERMINED: PROCEED TO NEXT PATH | 1 | 2 | 1 | | 1 | | 1 | Next |
| | D | CHECK STATE | SET STATE=2 | 1 | 2 | 1 | 2 | 1 | | 1 | Next |
| | | REFER TO TABLE | STATE OF PATHS C AND E IS DETERMINED | 1 | 2 | 1 | 2 | 1 | | 1 | Next |
| | E | CHECK STATE | DETERMINED: PROCEED TO NEXT PATH | 1 | 2 | 1 | 2 | 1 | | 1 | Next |
| | F | CHECK STATE | SET STATE=2 | 1 | 2 | 1 | 2 | 1 | 2 | 1 | Next |
| | | REFER TO TABLE | STATE OF PATHS E AND G IS DETERMINED | 1 | 2 | 1 | 2 | 1 | 2 | 1 | Next |
| | G | CHECK STATE | DETERMINED: PROCEED TO NEXT PATH | 1 | 2 | 1 | 2 | 1 | 2 | 1 | Next |
| | H | CHECK STATE | PROCEED TO NEXT PATH | 1 | 2 | 1 | 2 | 1 | 2 | 1 | Next |
| | | | PATH NOT YET DETERMINED REMAINS | 1 | 2 | 1 | 2 | 1 | 2 | 1 | Next |
| | | FIX ORDER | CLEAR "Next" AND PROCEED TO NEXT ORDER | 1 | 2 | 1 | 2 | 1 | 2 | 1 | |
| 3 | A | CHECK STATE | DETERMINED: PROCEED TO NEXT PATH | 1 | 2 | 1 | 2 | 1 | 2 | 1 | |
| | B | CHECK STATE | DETERMINED: PROCEED TO NEXT PATH | 1 | 2 | 1 | 2 | 1 | 2 | 1 | |
| | C | CHECK STATE | DETERMINED: PROCEED TO NEXT PATH | 1 | 2 | 1 | 2 | 1 | 2 | 1 | |
| | D | CHECK STATE | DETERMINED: PROCEED TO NEXT PATH | 1 | 2 | 1 | 2 | 1 | 2 | 1 | |
| | E | CHECK STATE | DETERMINED: PROCEED TO NEXT PATH | 1 | 2 | 1 | 2 | 1 | 2 | 1 | |
| | F | CHECK STATE | DETERMINED: PROCEED TO NEXT PATH | 1 | 2 | 1 | 2 | 1 | 2 | 1 | |
| | G | CHECK STATE | DETERMINED: PROCEED TO NEXT PATH | 1 | 2 | 1 | 2 | 1 | 2 | 1 | |
| | H | CHECK STATE | SET STATE=3 | 1 | 2 | 1 | 2 | 1 | 2 | 1 | 3 |
| | | REFER TO TABLE | STATE OF PATHS G IS DETERMINED | 1 | 2 | 1 | 2 | 1 | 2 | 1 | 3 |
| | | FIX ORDER | FIX STATE OF ALL PATHS | 1 | 2 | 1 | 2 | 1 | 2 | 1 | 3 |

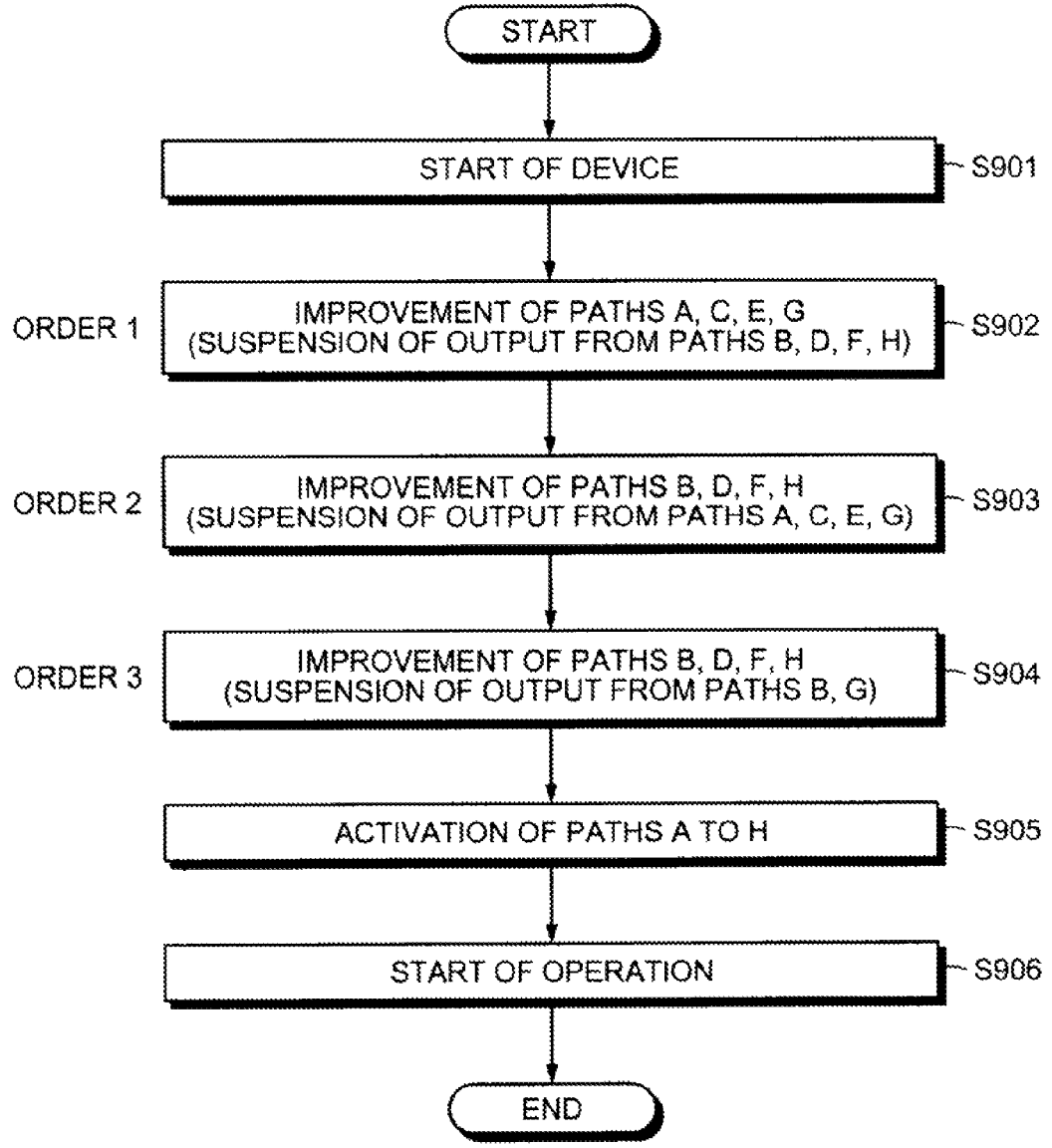

COMMUNICATION DEVICE AND METHOD OF SETTING COMMUNICATION DEVICE

CROSS REFERENCE TO RELATED APPLICATIONS

This application is based upon and claims the benefit of priority of the prior Japanese Patent Application No. 2011-022150, filed on Feb. 3, 2011, the entire contents of which are incorporated herein by reference.

FIELD

The embodiments discussed herein are related to a communication device that transmits an electrical signal and a method of setting the communication device.

BACKGROUND

It is common to transmit electrical signals using a back wiring board (BWB) that is housed in a communication device or an information processing apparatus and on which a plug-in unit(s) is mounted. The transmission speed of recent communication devices has increased due to increased transmission capacity, and thus a technique such as pre-emphasis and line equalization is used to ensure transmission quality. The settings for pre-emphasis and line equalization are adjusted to be favorable for each path to achieve a favorable transmission quality.

The communication device includes multiple paths from a transmission unit to a reception unit via the back wiring board. In a high-speed path, the transmission unit includes a pre-emphasis unit and the reception unit includes a line equalization unit. The reception unit also includes a signal monitoring unit that monitors the state (waveform) of a received signal. The communication device adjusts the settings of the pre-emphasis unit and the line equalization unit, based on the monitoring results such that the state of the received signal becomes favorable.

Such a high-density and high-speed communication device has a problem of crosstalk that occurs between paths. Generally, crosstalk occurs between paths (parallel wiring patterns) close to each other and at connectors of the back wiring board and the transmission unit or the reception unit. Thus, technology for checking crosstalk noise by a program, based on the direction of signal transmission of the path, the signal (drive circuit) timing, etc. has been proposed (see, for example, Japanese Laid-Open Patent Publication No. 2000-67104).

In such a high-density and high-speed communication device, the waveform of the received signal is distorted due to the crosstalk between paths. Thus, if the emphasis/equalization settings are adjusted based on the state of the received signal at the reception unit (in this case, the distorted waveform), the entire waveform is distorted and the transmission characteristics expected from the path specifications cannot be achieved.

FIG. 10 is a diagram for explaining the effect of crosstalk on the adjustment of pre-emphasis. A transmission waveform A represents a pulsed transmission waveform during the adjustment of pre-emphasis. The corresponding reception waveform A represents a reception waveform during the adjustment of pre-emphasis, on which crosstalk XT is imposed thereby making the apparent amplitude of the rising edge a larger than the actual amplitude. The reception unit makes a determination concerning emphasis solely based on the reception waveform A affected by the crosstalk XT, and erroneously determines that the reception waveform A is good and pre-emphasis control at the transmission unit is not necessary.

Consequently, the transmission unit transmits a signal having a transmission waveform B without pre-emphasis (the same as the transmission waveform A) even when crosstalk XT occurs, and the reception unit detects a reception waveform B for which the transmission characteristics cannot be enhanced due to the shallow rising edge b and the small eye. On the other hand, even when there is no crosstalk, the eye can be made larger by determining at the emphasis determination to perform pre-emphasis. The transmission waveform and the reception waveform in this case are represented by a transmission waveform C and a reception waveform C. It is preferable for the reception unit to receive a good reception waveform C having a sharp rising edge c, which is impossible in the conventional technology.

As described above, to eliminate the effect of crosstalk by adjusting the emphasis/equalization settings, it is necessary to adjust the settings appropriately based on the state of crosstalk. However, as described above, emphasis/equalization settings simply based on the reception waveform cannot achieve an appropriate reception waveform, thereby preventing the enhancement of transmission characteristics.

SUMMARY

According to an aspect of an embodiment, a communication device includes multiple paths that are provided in the device and transmit signals; an adjuster that adjusts transmission characteristics to be a favorable state by adjustment of the waveform of the signals on the paths; and a controller that controls the adjustment of the transmission characteristics of the paths by the adjuster, identifies other path(s) that affects a path to be adjusted, and controls suppression of crosstalk due to the other path(s).

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram of the crosstalk table according to the first embodiment.

FIG. 3 is a flowchart of the improvement process of paths according to the first embodiment.

FIG. 4 is a flowchart of a process of determining the number of times improvement is to be implemented according to the first embodiment.

FIG. 5 is a diagram of a data table used in determining the number of times improvement is to be implemented according to the first embodiment.

FIG. 7 is a diagram of each crosstalk table according to the second embodiment.

FIG. 8 is a diagram of a data table used in the determination of the number of times improvement is to be implemented according to the second embodiment.

FIG. 9 is a flowchart of the improvement process of paths according to the second embodiment.

DESCRIPTION OF EMBODIMENTS

Preferred embodiments of the present invention will be explained with reference to the accompanying drawings.

In a first embodiment, an improvement process is performed in units of paths throughout the entire communication device. The improvement process is an adjustment to enhance transmission characteristics of paths, and sets (adjusts) the waveform of an electrical signal to a favorable state using pre-emphasis and line equalization. Further, each of the paths can be improved without being affected by crosstalk from other paths.

Figure 1:
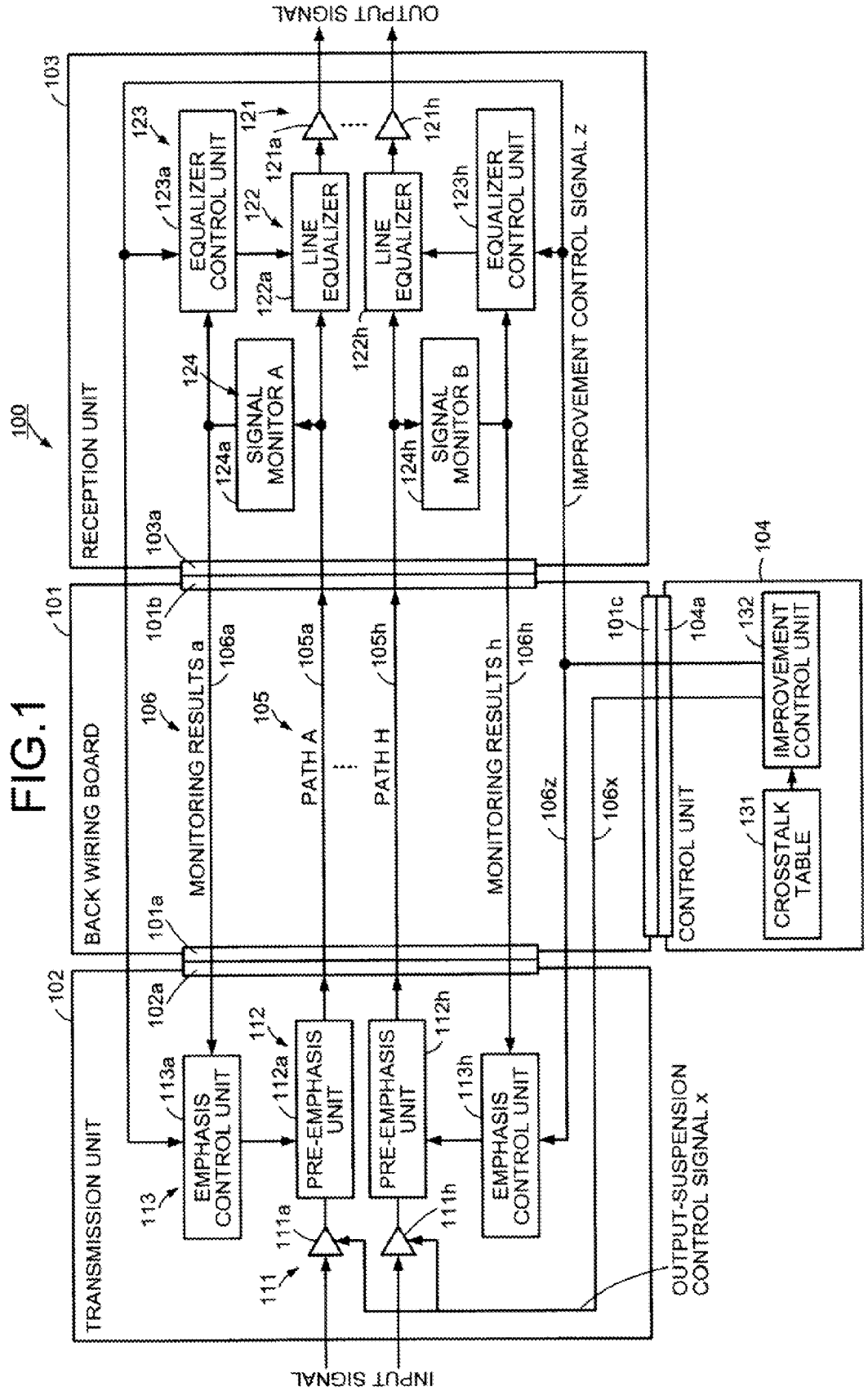
FIG. 1 is a block diagram of a communication device according to the first embodiment.

FIG. 1 is a block diagram of a communication device according to the first embodiment. A communication device 100 includes a back wiring board 101, a transmission unit 102, a reception unit 103, and a control unit 104. The control unit may also be referred to as a controller. The controller may be a control circuit, or a central processing unit. Paths 105 for high-speed signal transmission are provided from the transmission unit 102 to the reception unit 103 via the back wiring board 101. Although the paths 105 include 8 paths A to H, only 2 paths A and H (and related components) are depicted in FIG. 1 for simplicity.

For example, the communication device 100 is a rack-mount server. The transmission unit 102 and the reception unit 103 are inserted through slots (openings) provided on the front of the casing. A connector 102a of the transmission unit 102 and a connector 103a of the reception unit 103 are inserted into connectors 101a and 101b of the back wiring board 101 provided on the back of the casing, thereby forming the paths 105. The control unit 104 is also electrically connected to the back wiring board 101 by its connector 104a and a connector 101c of the back wiring board 101.

The back wiring board 101 includes multiple paths 105 (A to H) for signals from the transmission unit 102 to the reception unit 103, and data buses 106 for control signals. In actuality, there are as many as thousands of paths having a length of about 1 m. The data buses 106 are provided to exchange among the transmission unit 102, the reception unit 103, and the control unit 104, information necessary for controlling improvement. Here, the data buses 106 are used for transmitting monitoring results (a to h) of the paths 105 (A to H) detected by the reception unit 103, and an output-suspension control signal x and an improvement control signal z that are output from the control unit 104 to the transmission unit 102 (and the reception unit 103).

The transmission unit 102 includes transmitters (transmission amplifiers) 111, pre-emphasis units (signal emphasizing units) 112, and emphasis control units 113 that are provided for the 8 paths 105, respectively. However, only transmitters 111a and 111h, pre-emphasis units 112a and 112h, and emphasis control units 113a and 113h corresponding to 2 paths 105 (A and H) are depicted in FIG. 1.

The reception unit 103 includes receivers (reception amplifiers) 121, line equalizers (signal shaping units) 122, equalizer control units 123, and signal monitors 124 that are provided for the 8 paths 105, respectively. However, for simplicity, only receivers 121a and 121h, line equalizers 122a and 122h, equalizer control units 123a and 123h, and signal monitors (A and B) 124a and 124h corresponding to 2 paths 105 (A and H) are depicted in FIG. 1. Furthermore, the line equalizers 122 and the pre-emphasis units 112 of the transmission unit 102 form an adjuster. The adjuster may further be an adjusting circuit.

The control unit 104 includes a crosstalk table 131 and an improvement control unit 132. The crosstalk table 131 stores, for each of the paths 105 (A to H), a combination of paths 105 (A to H) that can cause crosstalk in the path. In other words, the crosstalk table 131 stores a combination of other paths 105 that do not cause crosstalk in a given path 105 and thus are operable at the same time. The improvement control unit 132 identifies the combination of the other paths 105, based on the information set in the crosstalk table 131, and improves the given path and the other paths 105.

In the improvement control of emphasis/equalization, the improvement control unit 132 outputs the improvement control signal z to the emphasis control units 113 (113a to 113h) of the transmission unit 102 and the equalizer control units 123 (123a to 123h) of the reception unit 103 via the data bus 106z. In the improvement of a given path 105, the improvement control unit 132 outputs, via the data bus 106x, the output-suspension control signal x for suspending the output of signals from the other paths 105 that cause crosstalk in the given path 105.

For example, the control unit 104 is a computer and the improvement control unit 132 is a CPU that uses a RAM as a work area executes a program that is for improvement control and stored in a ROM. The crosstalk table 131 is stored in the RAM, which is a storage unit. The storage unit may also be referred to as storage and may be a storage circuit.

The connection of the paths 105 and of the data buses 106 between the transmission unit 102 and the reception unit 103 via the back wiring board 101 is described. With respect to the path 105a (A), a signal output from the transmitter 111a of the transmission unit 102 is emphasized by the pre-emphasis unit 112a, transmitted on the path 105a (A) of the back wiring board 101, shaped by the line equalizer 122a, and output to the receiver 121a.

The signal monitor 124a (A) of the reception unit 103 detects the waveform of the signal on the path 105a (A), and outputs the detected monitoring results a to the equalizer control unit 123a and the emphasis control unit 113a of the transmission unit 102 via the data bus 106a. Based on the monitoring results a, the emphasis control unit 113a controls pre-emphasis performed on a transmitted signal by the pre-emphasis unit 112a of the path 105a (A), and the equalizer control unit 123a controls line equalization (such as waveform shaping) performed on a received signal by the line equalizer 122a of the path 105a (A).

The pre-emphasis and the line equalization are performed while the waveform indicated by the monitoring results a is monitored, and the pre-emphasis value and/or the line equalization value are changed such that the waveform of the signal becomes a good state at the signal monitor 124a (A). Although only the path 105a (A) and related components are described above, other paths 105 (B to H) are configured in a similar manner, and related components are connected by the paths 105 and data buses 106, respectively.

FIG. 2 is a diagram of the crosstalk table according to the first embodiment. Rows indicate paths A to H that are to be improved, and columns indicate paths A to H that cause crosstalk in each of the paths A to H to be improved. The paths 105 (A to H) are arranged in parallel and in the order of A to H. Here, it is assumed that crosstalk occurs between paths. However, crosstalk can occur at the connectors 101a to 101c, 102a, 103a, and 104a since signals transmitted on paths can intersect or come close to each other due to the arrangement of pins for internal signals. Thus, the crosstalk table 131 also includes information on crosstalk caused at the connectors 101a to 101c, 102a, 103a, and 104a.

The crosstalk table 131 indicates that the path B cannot be active (cannot transmit signal) when the path A is being improved, since the path B is adjacent to the path A and causes crosstalk in the path A (see "o"). The crosstalk table 131 also indicates that the paths A and C cannot be active (cannot transmit signal) when the path B is being improved, since the paths A and C are adjacent to the path B and causes crosstalk in the path B.

In the improvement of the paths A to H, the improvement control unit 132 refers to the crosstalk table 131, specifies a given path 105 to be improved, and outputs the improvement control signal z specifying the path, via the data bus 106z. The improvement control signal z is input, via the data bus 106z, to the emphasis control unit 113 of the transmission unit 102 and the equalizer control unit 123 of the reception unit 103 corresponding to the path, where the improvement of emphasis/equalization is performed.

In the implementation of improvement, the improvement control unit 132 reads from the crosstalk table 131, paths that cause crosstalk in the path 105 that is to be improved, and outputs the output-suspension control signal x to the transmitters 111 of the paths via the data bus 106x, thereby suspending the output of signals from the paths. When the path B is improved, the output of signals from the adjacent paths A and C is suspended.

FIG. 3 is a flowchart of the improvement process of paths according to the first embodiment. The process depicted in FIG. 3 is controlled by the control unit 104. A process of suspending the output of signals from paths that cause crosstalk in multiple given paths subject to improvement and collectively improving the paths, is described with reference to FIG. 3.

The process depicted in FIG. 3 is executed at each start of the communication device. The improvement control unit 132 of the control unit 104 checks the arrangement of paths 105 at the start (operation S301). The arrangement can change with a change in the number of units of the communication device 100 (i.e., the number of transmission units 102 and the reception units 103 attached to the back wiring board 101) and/or the internal wiring of connectors (i.e., connector specification), which differs for each unit, resulting in a change of values set in the crosstalk table 131. Here, it is assumed that the crosstalk table 131 is updated according to the latest configuration of the communication device 100. The control unit 104 refers to the crosstalk table 131 at the start of the device and reads the arrangement of the paths 105 (A to H).

The control unit 104 calculates the number of paths 105 that can be improved at the same time based on the information stored in the crosstalk table 131. In the example of the crosstalk table 131 depicted in FIG. 2, paths that cause crosstalk in a given path are a pair of paths adjacent to the given path. Thus, in the first improvement implementation, the improvement control unit 132 selects every other path 105 (A, C, E, G) as paths to be improved (operation S302, order 1).

In this case, 4 paths are selected since the total number of paths is 8. The improvement control signal z is output to the selected paths (A, C, E, G), that is, to the emphasis control units 113 (113a, 113c, . . . ) of the transmission unit 102 and the equalizer control units 123 (123a, 123c, . . . ) of the reception unit 103 corresponding to the paths 105 (A, C, E, G), via the data bus 106z.

Thus, in the paths 105 (A, C, E, G) that are to be improved, the emphasis control units 113 control the pre-emphasis units 112 to improve the pre-emphasis values, and the equalizer control units 123 control the line equalizers 122 to improve the line equalization values and performs a matching process on the pre-emphasized input signal. Thus, the signals on the paths 105 (A, C, E, G) are improved.

At operation S302, the transmitters 111 of the transmission unit 102 output signals to the paths 105 (A, C, E, G) to be improved. At the same time, the improvement control unit 132 refers to the crosstalk table 131 and obtains information concerning the paths 105 (B, D, F, H) adjacent to the paths (A, C, E, G) to which the signals are output, and outputs the output-suspension control signal x to the paths 105 (B, D, F, H), that is, to the transmitters 111 (111b, 111d, . . . ) of the transmission unit 102 corresponding to the paths 105 (B, D, F, H), via the data bus 106x.

Thus, the improvement process of the paths 105 (A, C, E, G) can be performed without being affected by crosstalk, by suspending the output of signals from the adjacent paths 105 (B, D, F, H).

In the second improvement implementation, the improvement control unit 132 refers to the crosstalk table 131 and selects the remaining 4 paths 105 (B, D, F, H) that have not yet been improved, and improves the paths 105 (B, D, F, H) in a similar manner (operation S303, order 2). During the implementation of improvement, the output of signals from the paths 105 (A, C, E, G) adjacent to the paths 105 (B, D, F, H) to be improved is suspended.

Thus, all paths 105 (A to H) are improved, and favorable emphasis/equalization values are set. The improvement control unit 132 then activates the output of each path 105 (A to H) (operation S304), and starts the operation as the communication device 100 (operation S305).

As described above, when the path A is to be improved, the path C located further than the adjacent path B can be set active and improved at the same time, thereby reducing the number of times that improvement is implemented for the paths 105. Here, 8 paths can be improved by 2 (not 8) executions, thereby reducing the time required for the improvement process.

FIG. 4 is a flowchart of a process of determining the number of times improvement is to be implemented according to the first embodiment. In the process depicted in FIG. 4, the improvement control unit 132 reads the crosstalk table 131 depicted in FIG. 2 and determines the number of multiple paths to be improved at the same time and the order in which the paths are to be improved.

The order has the initial value 1 and is incremented by 1, and the paths A to H are subjected to the determination in this order (operation S401). The improvement control unit 132 checks the state of the path set at operation S401 (operation S402), and if the state indicates that the order is not yet determined (operation S402: Not yet determined), determines the order set at operation S401 as the state of the path, and refers to the crosstalk table 131 to identify an adjacent path(s) that causes crosstalk in the path (operation S403).

The improvement control unit 132 checks the state of the adjacent path(s) (i.e., checks for path(s) set with "o" in the crosstalk table 131 depicted in FIG. 2) (operation S404). If the state indicates that the order is not yet determined (operation S404: Not yet determined), sets the state of the path(s) to be "Next" indicating that the path is to be subject to improvement at any subsequent implementation (operation S405). If the order has been already determined (set as "Next") at operation S402 or S404 (operation S402: Next, operation S404: Next), the process proceeds to operation S406.

The improvement control unit 132 determines whether the last path H has been reached (operation S406). If so (operation S406: YES), the improvement control unit 132 determines whether the order of each path has been fixed (operation S407). If so (operation S407: YES), the determination process of the order ends.

If the last path H is not yet reached (operation S406: NO), the target path is changed to the next path (operation S408) and the operations subsequent to operation S402 are repeated. If the order of each path is not yet fixed (operation S407: NO), to fix one order and determine another order, the paths having the states set as "Next" are cleared, the target path is initialized to the path A (operation S409), and operations subsequent to operation S402 are repeated.

FIG. 5 is a diagram of a data table used in determining the number of times improvement is to be implemented according to the first embodiment. The results of the process depicted in FIG. 4 are sequentially entered in the "STATE" column of a data table 500 that is stored in, for example, a ROM that can be written to by the improvement control unit 132.

The data table 500 depicted in FIG. 5 includes all data after the completion of the process depicted in FIG. 4. Details of the operations depicted in FIG. 4 are described on the left. The "STATE" column on the right is data written when the state is checked at operation S402 and "Next" is set at operation S405. The order (1 and 2) once written into the "STATE" column is retained without being deleted, while "Next" is cleared when the order is incremented from 1 to 2.

The entry of data into each column of "STATE" depicted in FIG. 5 is described along with the flowchart of FIG. 4. At operation S401, the order=1 and the path=A. The state of the path A set at operation S401 is checked at operation S402, and since the order of the path A is not yet determined, the order=1 (initial value) is entered in the state of the path A (row 501, first line). At operation S403, the crosstalk table 131 is referred to and the adjacent path B that causes crosstalk is obtained. At operation S404, the state of the adjacent path B (i.e., a path having "o" in the crosstalk table 131) is checked, and since the order is not yet determined, "Next" is entered in the state of the path B at operation S405 (row 501, second line).

Since the path=A at operation S406, the path is transitioned to the next path B at operation S408, and the state of the path B is checked at operation S402 (row 502). Since the path=B, the process diverges from operation S402 (operation S402: Next) and proceeds to operation S406. The path is transitioned to the next path C at operation S408, and the path C is subjected to the determination process at operation S402.

Thereafter, the determination process is repeated for the paths C to H, thereby entering data into each column of "STATE" sequentially. When determination has been made for the paths up through the path H, where operation S406: YES, and operation S407: NO, the process proceeds to operation S409. The order is incremented to 2 at operation S409, the paths of the order 1 are fixed (row 506), and only "Next" is cleared (row 507).

The determination process (operations subsequent to operation S402) is performed with the order=2 and the path=A, and the order=2 is entered in the state. The state of the path A entered at operation S401 is checked at operation S402, and since the order of the path A has been already determined, the process proceeds to operation S406 without changing the determined order 1 (row 510).

Since the path=A at operation S406, the path is transitioned to the next path B at operation S408, and the state of the path B is checked at operation S402 (row 511). The order=2 is set for the path=B (row 511, first line). It is determined at operation S404 that the state (the order) of the paths A and C that cause crosstalk in the path B has been already determined to be 1 and is stored in the data table 500 (row 511, second line).

Similarly, the determination process is repeated for the paths C to H, thereby entering data into each column of "STATE" of the data table 500 sequentially. When determination has been made for the paths up through the path H, the improvement control unit 132 determines whether the order of each path has been determined at operation S407, and ends the determination process of the order after checking that all paths A to H have an order of 1 or 2 in the row 512.

In the above description, paths are selected in the order determined by the process depicted in FIG. 3 by referring to the crosstalk table 131 depicted in FIG. 2. For example, paths can be selected based on the data table 500 depicted in FIG. 5 generated by the process depicted in FIG. 4. That is, the improvement control unit 132 selects paths according to the process depicted in FIG. 3, based on the order and information concerning paths that are stored in the data table 500 (i.e., the order of each path set in the last row 512 of the data table 500), and improves the selected paths. The improvement control unit 132 also refers to the crosstalk table 131 depicted in FIG. 2 and suspends the output of signals from paths that cause crosstalk in the selected paths, and then activates all paths and starts the operation of the communication device 100.

Thus, the improvement control unit 132 can improve all paths A to H by two improvement implementations in which the paths are separated into the order 1 and the order 2 as entered in the data table 500. In other words, 8 improvement implementations for 8 paths are not required; instead, only 2 improvement implementations of 4 paths are required for 8 paths, thereby reducing the time required for the improvement process.

As described above, the communication device according to the first embodiment can appropriately adjust signals transmitted on paths without being affected by crosstalk, thereby enhancing the transmission characteristics of the paths. The operation of paths that cause crosstalk in the paths to be improved is suspended during the improvement implementation (adjustment) for the pre-emphasis unit and the line equalizer, thereby preventing undesirable consequences such as signal waveform distortion.

Thus, the adjustment of signals using the pre-emphasis unit and the line equalizer can be improved, the settings of the pre-emphasis unit and the equalizer can be improved, and the expected transmission characteristics of the paths can be achieved. Thus, allowing for excess margin in the design of the communication device 100 is not necessary. Further, the back wiring board 101 can be made from less expensive material. If the back wiring board 101 is made from a material of the same quality, the improvement process makes it possible to use a signal having smaller amplitude, thereby reducing power consumption and increasing the transmission speed.

Further, the combination of paths that are provided in the communication device and that can be improved at the same time without being affected by crosstalk is obtained by referring to the crosstalk table that stores the number of paths and the state of paths that cause crosstalk in each path. Thus, the number of times that improvement is implemented for the paths can be minimized, all paths can be improved in a shorter time, and the improvement can be performed efficiently.

In a second embodiment, an improvement process that is not affected by crosstalk over the entire communication device 100 is performed in units of paths for each unit provided in the communication device 100.

Figure 6:
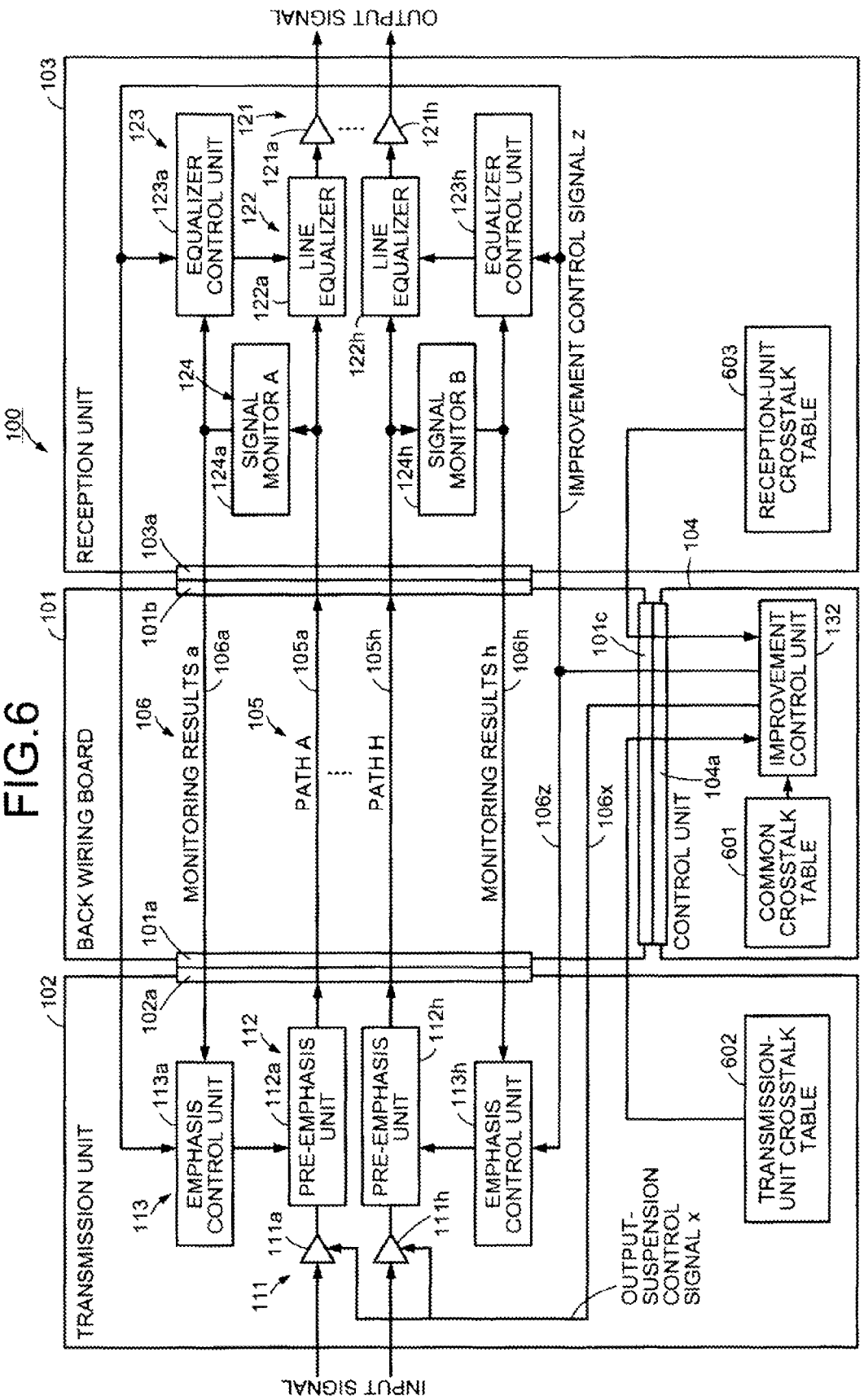
FIG. 6 is a block diagram of a communication device according to the second embodiment.
Figure 10:
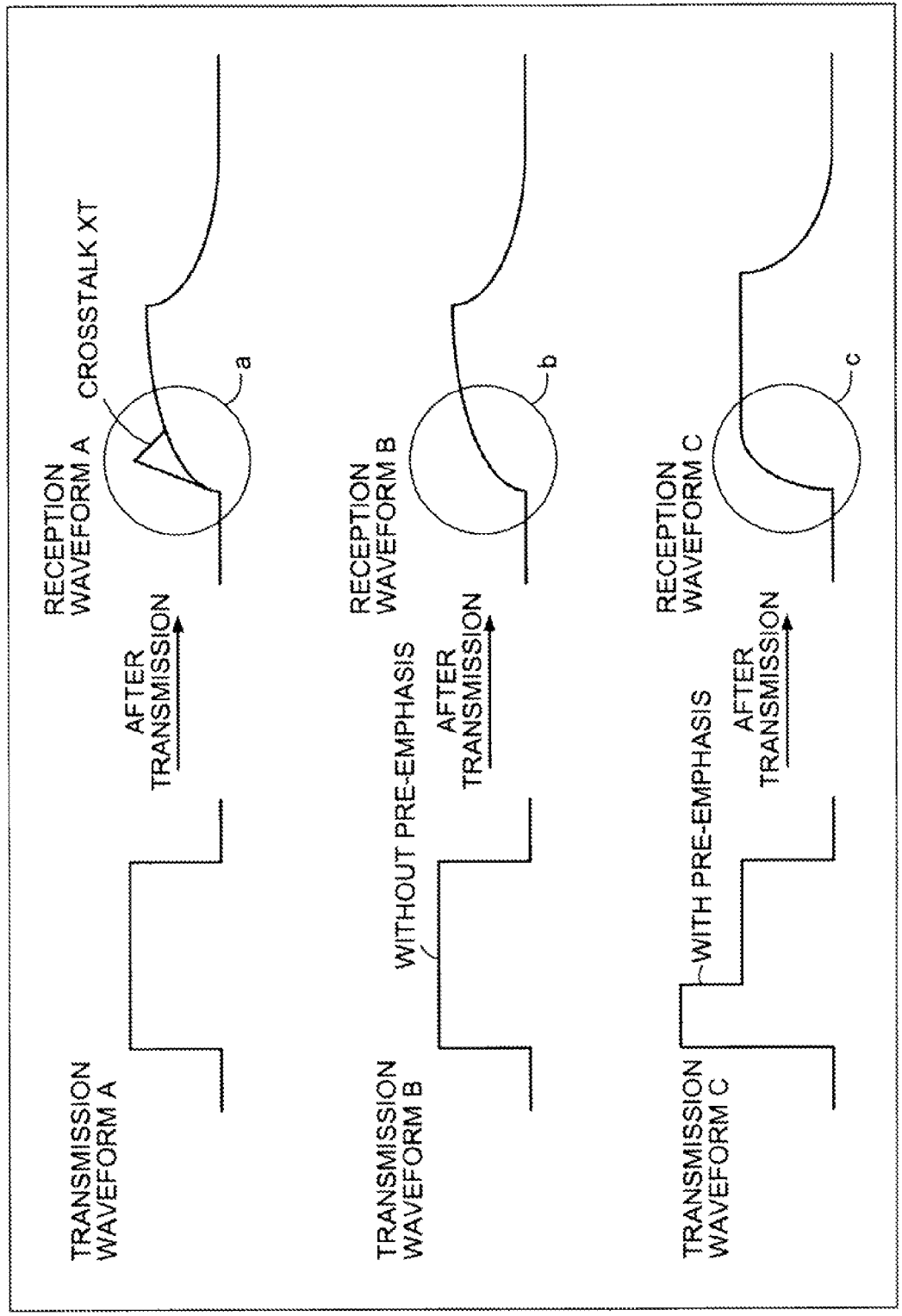
FIG. 10 is a diagram for explaining the effect of crosstalk on the adjustment of pre-emphasis.

FIG. 6 is a block diagram of a communication device according to the second embodiment. Components identical to those of the first embodiment (FIG. 1) are assigned the same reference numerals used in the first embodiment. In the second embodiment, the back wiring board 101 includes a common crosstalk table 601, the transmission unit 102 includes a transmission-unit crosstalk table 602, and the reception unit 103 includes a reception-unit crosstalk table 603. Alternatively, the common crosstalk table 601, the transmission-unit crosstalk table 602, and the reception-unit crosstalk table 603 may be centralized and provided in, for example, the back wiring board 101.

The common crosstalk table 601 stores information on crosstalk caused on the paths 105 within the back wiring board 101. The transmission-unit crosstalk table 602 stores information on crosstalk caused on the paths within the transmission unit 102. The reception-unit crosstalk table 603 stores information on crosstalk caused on the paths within the reception unit 103.

The information on crosstalk stored in the common crosstalk table 601, the transmission-unit crosstalk table 602, and the reception-unit crosstalk table 603 is read by the improvement control unit 132.

FIG. 7 is a diagram of each crosstalk table according to the second embodiment. The common crosstalk table 601 is the same as the crosstalk table 131 depicted in FIG. 2. The transmission-unit crosstalk table 602 indicates that the path F causes crosstalk in the path A within the transmission unit 102, and vice versa (602a). The reception-unit crosstalk table 603 indicates that the path H causes crosstalk in the path B within the reception unit 103, and vice versa (603a).

The improvement control unit 132 reads the common crosstalk table 601, the transmission-unit crosstalk table 602, and the reception-unit crosstalk table 603, and generates a merged crosstalk table 701 in a storage such as a ROM (not depicted). The merged crosstalk table 701 is generated by merging (adding) all contents of the common crosstalk table 601, the transmission-unit crosstalk table 602, and the reception-unit crosstalk table 603.

In the second embodiment, the improvement control unit 132 determines the number of times improvement is to be implemented, in a similar manner to the first embodiment, that is, according to the flowchart of FIG. 4.

FIG. 8 is a diagram of a data table used in the determination of the number of times improvement is to be implemented according to the second embodiment. The entry of data into each column of "STATE" of the data table 800 depicted in FIG. 8 is described along with the flowchart of FIG. 4. The order=1 and the path=A at operation S401. The state of the path A set at operation S401 is checked at operation S402, and since the order of the path A is not yet determined, the order=1 (initial value) is set in the state of the path A (row 801, first line). At operation S403, the merged crosstalk table 701 is referred to and the paths B and F that cause crosstalk are obtained. At operation S404, the states of the paths B and H (i.e., paths having "o" in the merged crosstalk table 701) are checked, and since the order is not yet determined, "Next" is entered in the state of the paths B and F at operation S405 (row 801, second line).

Since the path=A at operation S406, the path is transitioned to the next path B at operation S408, and the state of the path B is checked at operation S402 (row 802). Since the path=B, the process diverges from operation S402 (operation S402: Next) and proceeds to operation S406. The path is transitioned to the next path C at operation S408, and the path C is subjected to the determination process at operation S402.

Thereafter, the determination process is repeated for the paths C to H, thereby entering data in each column of "STATE" sequentially. When the target path reaches the path H, the process proceeds to operation S409 (operation S406: YES, operation S407: NO). The order is incremented to 2 at operation S409, the paths of the order 1 are fixed (row 806), and only "Next" is cleared (row 807).

The determination process (operations subsequent to operation S402) is performed with the order=2 and the path=A, and the order=2 is entered in the state. The state of the path A set at operation S401 is checked at operation S402, and since the order of the path A has been already determined, the process proceeds to operation S406 without changing the determined order 1 (row 810).

Since the path=A at operation S406, the path is transitioned to the next path B at operation S408, and the state of the path B is checked at operation S402 (row 811). The order=2 is set for the path=B (row 811, first line). It is determined at operation S404 that the state (the order) of the paths A and C that cause crosstalk in the path B has been already determined to be 1 and is stored in the data table 500 (row 811, second line). The state of the path H is checked and since the order is not yet determined, "Next" is entered in the state of the path H at operation S405 (row 811, third line).

Similarly, the determination process is repeated for the paths C to H, thereby entering data into each column of "STATE" sequentially. When determination has been made for the paths up through the path H (operation S406: YES, operation S407: NO), the process proceeds to operation S409. The order is incremented to 3 at operation S409, the paths of the order 2 are fixed (row 812), and only "Next" is cleared (row 813).

The determination process (operations subsequent to operation S402) is performed with the order=3 and the path=A. In this process, the order=3 is entered at operation S402 for the path H for which order is not yet determined (row 821, first line). It is also determined that the state (order) of the path G that causes crosstalk in the path H has been already determined to be 1 and is stored in the data table 500 (row 821, second line). Finally, when determination has been made for the paths up through the last path H, it is determined whether the order of each path has been determined at operation S407, and the determination process of the order is ended after checking that all paths A to H have an order of 1, 2, or 3 in the row 822.

FIG. 9 is a flowchart of the improvement process of paths according to the second embodiment. The improvement control unit 132 of the control unit 104 refers to the order of each path set in the last row 822 of the data table 800, and selects the paths in the indicated order. The improvement control unit 132 also refers to the merged crosstalk table 701 depicted in FIG. 7, and suspends the output of signals from paths that cause crosstalk.

The implementation of improvement for the communication device 100 is executed at each start of the communication device (operation S901). The improvement control unit 132 refers to the data table 800, and in the first improvement implementation, selects multiple paths 105 (A, C, E, G) for which the order has been set as 1 (operation S902). The improvement control signal z is output to the selected paths (A, C, E, G), that is, to the emphasis control units 113 (113a, 113c, . . . ) of the transmission unit 102 and the equalizer control units 123 (123a, 123c, . . . ) of the reception unit 103 corresponding to the paths 105 (A, C, E, G), via the data bus 106z.

Thus, in the paths 105 (A, C, E, G) that are to be improved, the emphasis control units 113 control the pre-emphasis units 112 to improve the pre-emphasis values, and the equalizer control units 123 control the line equalizers 122 to improve the line equalization values and perform a matching process on the pre-emphasized input signal. Thus, the signals on the paths 105 (A, C, E, G) are improved.

At operation S902, the transmitters 111 of the transmission unit 102 output signals to the paths 105 (A, C, E, G) to be improved. At the same time, the improvement control unit 132 refers to the merged crosstalk table 701 and obtains information concerning the paths 105 (B, D, F, H) that cause crosstalk in the paths (A, C, E, G) to be improved, and outputs the output-suspension control signal x to the paths 105 (B, D, F, H), that is, to the transmitters 111 (111b, 111d, . . . ) of the transmission unit 102 corresponding to the paths 105 (B, D, F, H), via the data bus 106x.

Thus, the improvement process of the paths 105 (A, C, E, G) can be performed without being affected by crosstalk, by suspending the output of signals from the paths 105 (B, D, F, H) that cause crosstalk in the paths 105 (A, C, E, G).

In the second improvement implementation, the improvement control unit 132 refers to the data table 800 and selects paths 105 (B, D, F) for which the order is set as 2, and improves the paths 105 (B, D, F) in a similar manner (operation S903). The improvement control unit 132 also refers to the merged crosstalk table 701 and obtains information concerning the paths 105 (A, C, E, G, H) that cause crosstalk in the paths 105 (B, D, F) to be improved, and suspends the output of signals from the paths 105 (A, C, E, G, H).

In the third improvement implementation, the improvement control unit 132 refers to the data table 800 and selects the path 105 (H) for which the order is set as 3, and improves the path 105 (H) in a similar manner (operation S904). The improvement control unit 132 also refers to the merged crosstalk table 701, and obtains information concerning the paths 105 (B, G) that cause crosstalk in the path 105 (H) to be improved, and suspends the output of signals from the paths 105 (B, G).

Thus, all paths 105 (A to H) are improved, and favorable emphasis/equalization values are set. The improvement control unit 132 then activates the output of each path 105 (A to H) (operation S905), and starts the operation as the communication device 100 (operation S906).

In the above improvement process, the order of the path H is set as 3 since the path H cannot be improved at the same time as the paths B, D, F (having the order 2) due to the paths B and G, which cause crosstalk in the path H. Thus, the combination of paths can be identified and the order can be determined by executing the process depicted FIG. 4 using the merged crosstalk table 701 in which the state of crosstalk between paths is set.

As described above, the communication device according to the second embodiment can adjust signals transmitted on paths without being affected by crosstalk in a similar manner to the first embodiment, thereby enhancing the transmission characteristics of the paths. The operation of paths that cause crosstalk in the paths that are to be improved is suspended during the implementation of improvement (adjustment) for the pre-emphasis unit and the line equalizer, thereby preventing undesirable consequences such as signal waveform distortion.

In the second embodiment, information concerning crosstalk at the transmission unit 102 and the reception unit 103 is gathered and entered into the merged crosstalk table. Thus, by merely setting the state of crosstalk for each unit of the communication device 100, paths throughout the entire communication device 100 can be improved without being affected crosstalk even when crosstalk occurs within the transmission unit 102 or the reception unit 103. Since a different state of the occurrence of crosstalk can be set for each unit, the communication device 100 can be easily adapted when a unit is replaced, without resetting the entire crosstalk table.

The improvement control unit 132 can separate and improve all paths A to H in the order set in the data table 500. A path(s) that cannot be improved at the same time is removed from a given order and put in another order, thereby increasing as much as possible, the number of paths that can be improved at the same time without being affected crosstalk and reducing the time required for the improvement process.

For simplicity, the number of paths 105 has been described as 8 in the above embodiments. In actuality, the communication device 100 includes, for example, 100 paths 105 for each transmission unit 102 (or reception unit 103). Since 10 units (transmission units 102 and reception units 103) are connectable to the back wiring board 101, as many as 1000 paths 105 are provided on the back wiring board 101. Nevertheless, as described above, the communication device 100 can minimize the number of times that improvement is implemented (the order of improvement) of the paths by identifying combinations of paths to be improved at the same time. The greater the number of the paths is, the shorter the time required for improvement becomes, thereby enhancing the efficiency of the improvement implementation.

As another embodiment, the transmission unit may be replaced with a transmitter; the reception unit may be replaced with a receiver; the control unit may be replaced with a controller; the pre-emphasis unit may be replaced with a pre-emphasis circuit; the emphasis control unit may be replaced with an emphasis controller; the line equalizer may be replaced with a line equalizer circuit; the improvement control unit may be replaced with an improvement control circuit; the equalizer control unit may be replaced with an equalizer controller; and the improvement control unit may be replaced with an improvement controller.

According to the communication device and the method of setting the communication device disclosed herein, signals transmitted on paths can be adjusted, unaffected by crosstalk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A communication device comprising:
a plurality of paths that are provided in the device and transmit signals;
a storage that stores, for each signal unit, information on a path and information on other path(s) that causes crosstalk in a signal on the path that are associated with each other;
an adjuster that adjusts transmission characteristics to be a favorable state by adjustment of the waveform of the signals on the paths; and
a controller that
gathers the information stored in the storage for each signal unit;

identifies, among the paths and based on the gathered information, a combination of paths of which transmission characteristics are adjustable at the same time, identifies the total number of adjustments for all paths and the order of the adjustments based on the combination, controls the adjustments of the transmission characteristics of the paths by the adjuster to be performed in the identified order, and controls suppression of crosstalk due to the other path(s).

2. The communication device according to claim 1, further comprising a plurality of signal units connected to the paths, wherein the storage stores, for each signal unit, the information concerning the path that transmits the signal and the information concerning the other path(s) that causes crosstalk in the signal on the path that are associated with each other.

3. The communication device according to claim 2, wherein the signal unit is formed by a transmission unit that transmits signals to the paths, a reception unit that receives the signals from the paths, and a back board unit to which the transmission unit and the reception unit are connected.

4. The communication device according to claim 1, wherein the adjuster is pre-emphasis units that adjust pre-emphasis values for signals output to the paths.

5. The communication device according to claim 1, wherein the adjuster is equalizing units that adjust equalization values for signals input thereto via the paths.

6. The communication device according to claim 1, wherein the controller suppresses crosstalk from the other path(s) by suspending a signal(s) on the other path(s).

7. A method of setting a communication device that includes a plurality of paths that are provided in the device and transmit signals;

a storage that stores, for each signal unit, information on a path and information on other path(s) that causes crosstalk in a signal on the path that are associated with each other;

an adjuster that adjusts transmission characteristics to be a favorable state by adjustment of the waveform of the signals on the paths, the method comprising:

gathering the information stored in the storage for each signal unit;

identifying, among the paths and based on the gathered information, a combination of paths of which transmission characteristics are adjustable at the same time, identifying the total number of adjustments for all paths and the order of the adjustments based on the combination, controlling the adjustments of the transmission characteristics of the paths by the adjuster to be performed in the identified order, and controlling suppression of crosstalk due to the other path(s).

* * * * *